United States Patent
Khan

(10) Patent No.: US 7,711,230 B2
(45) Date of Patent: May 4, 2010

(54) OPTICAL WAVEGUIDE

(75) Inventor: Sazzadur Rahman Khan, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 3 days.

(21) Appl. No.: 12/113,412

(22) Filed: May 1, 2008

(65) Prior Publication Data

US 2008/0273853 A1 Nov. 6, 2008

Related U.S. Application Data

(60) Provisional application No. 60/952,719, filed on Jul. 30, 2007.

(30) Foreign Application Priority Data

May 1, 2007 (JP) .............................. 2007-120892

(51) Int. Cl.
*G02B 6/10* (2006.01)
(52) U.S. Cl. ..................................... 385/129
(58) Field of Classification Search ........................ None
See application file for complete search history.

(56) References Cited

U.S. PATENT DOCUMENTS

| 3,563,630 | A |  | 2/1971 | Anderson | |
|---|---|---|---|---|---|
| 4,376,160 | A |  | 3/1983 | Evanchuk | |
| 5,659,648 | A | * | 8/1997 | Knapp et al. | 385/129 |
| 6,954,561 | B1 | * | 10/2005 | Khan et al. | 385/14 |
| 7,146,086 | B2 | * | 12/2006 | Tran et al. | 385/131 |
| 7,613,375 | B2 | * | 11/2009 | Shimizu | 385/129 |
| 2003/0128907 | A1 | * | 7/2003 | Kikuchi et al. | 385/14 |
| 2005/0105868 | A1 | * | 5/2005 | Arakida | 385/129 |
| 2005/0180714 | A1 | * | 8/2005 | Sano et al. | 385/132 |
| 2006/0002675 | A1 | * | 1/2006 | Choi et al. | 385/129 |
| 2007/0230870 | A1 | * | 10/2007 | Smith et al. | 385/32 |
| 2008/0107377 | A1 | * | 5/2008 | Cho et al. | 385/32 |

FOREIGN PATENT DOCUMENTS

| JP | 2003-43281 A | 2/2003 |
|---|---|---|
| JP | 2005-165138 A | 6/2005 |

OTHER PUBLICATIONS

Kaminow, I.P. et al., "Metal-Clad Optical Waveguides: Analytical and Experimental Study," Applied Optics, pp. 396-405, vol. 13, No. 2, Feb. 1974.
European Search Report dated Sep. 2, 2008; issued in corresponding European Application No. 08007631.8.

* cited by examiner

*Primary Examiner*—Mike Stahl
(74) *Attorney, Agent, or Firm*—Westerman, Hattori, Daniels & Adrian, LLP

(57) ABSTRACT

An optical waveguide includes a substrate, a core formed on the substrate and serving as a passageway for light, and a metal film, in which at least a portion of the core is covered with the metal film.

4 Claims, 5 Drawing Sheets

RELATED ART

OPTICAL WAVEGUIDE

RELATED APPLICATIONS

This application claims the benefit of U.S. Provisional Application No. 60/952,719, filed on Jul. 30, 2007, which is hereby incorporated by reference.

BACKGROUND OF THE INVENTION

1. Field of the Invention

The present invention relates to an optical waveguide for widespread use in optical communications, optical information processing, and other general optics.

2. Description of the Related Art

An optical waveguide is incorporated in an optical device such as an optical waveguide device, an optical integrated circuit, an optical wiring board and the like, and is widely used in the field of optical communications, optical information processing, and other general optics. In general, the optical waveguide includes cores serving as a passageway for light and formed in a predetermined pattern, and an under cladding layer and an over cladding layer formed so as to cover the cores (see, for example, JP-A-2005-165138). Such an optical waveguide is shown in FIG. 6. In FIG. 6, an under cladding layer 2, cores 3, and an over cladding layer 4 are formed in the order named on a substrate 1 to form the optical waveguide.

The refractive index of the above-mentioned cores 3 is made higher than that of the under cladding layer 2 and the over cladding layer 4 so that light passing inside the cores 3 does not exit from the cores 3. The cores 3, the under cladding layer 2 and the over cladding layer 4 are in general made of a synthetic resin. In particular, when the cores 3, the under cladding layer 2 and the over cladding layer 4 are made of a photosensitive resin, the formation thereof involves the need for the steps of coating, exposure to light, development and drying of liquid materials therefor.

However, the execution of the above-mentioned steps of coating, exposure to light, development and drying for each of the processes of forming the cores 3, the under cladding layer 2 and the over cladding layer 4 described above requires a large number of processing steps to result in the increase in costs. In this regard, there is room for improvement.

SUMMARY OF THE INVENTION

In view of the foregoing, it is therefore an object of the present invention to provide an optical waveguide which is capable of achieving reduction in the number of processing steps for manufacture and reduction in manufacturing costs.

To accomplish the above-mentioned object, an optical waveguide according to the present invention comprises a core formed on a substrate and serving as a passageway for light, wherein at least a portion of the above-mentioned core is covered with a metal film.

The optical waveguide according to the present invention, in which at least a portion of the core is covered with a metal film, eliminates the need to form a cladding layer (at least one of an under cladding layer and an over cladding layer) in that portion. The formation of the metal film may be carried out, for example, by using any one of a sputtering method, a plasma method, a chemical vapor deposition method, and a plating method. Covering of a portion of the core with the metal film can be carried out with a smaller number of processing steps than those required for the formation of a cladding layer. Accordingly, this provides reduction in the number of processing steps for manufacturing an optical waveguide and consequently provides a reduction in manufacturing costs.

DESCRIPTION OF THE PREFERRED EMBODIMENTS

Preferred embodiments of the present invention will now be described in detail with reference to the drawings.

Figure 1:
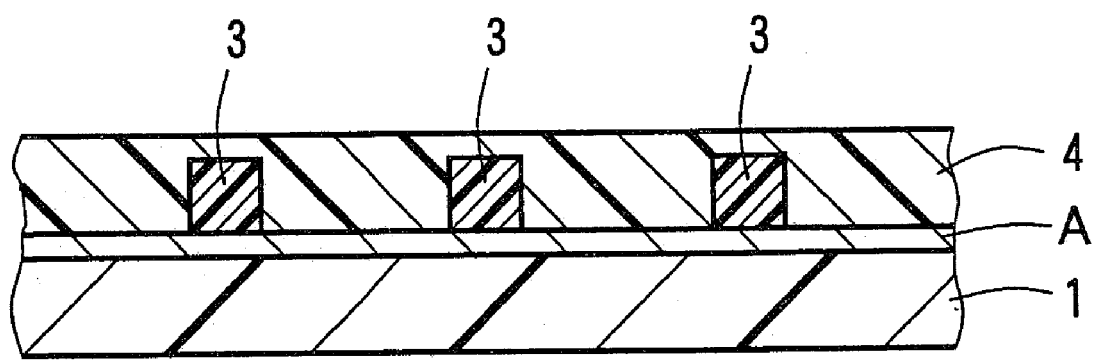
FIG. 1 is a sectional view schematically showing a first preferred embodiment of an optical waveguide according to the present invention.

FIG. 1 shows a first preferred embodiment of an optical waveguide according to the present invention. The optical waveguide according to this preferred embodiment includes a metal film A formed on a surface of a substrate 1 of a flat shape, a plurality of cores 3 formed in a predetermined pattern on a surface of the metal film A, and an over cladding layer 4 formed so as to cover the cores 3. The surface of the metal film A serves as a surface which reflects light passing through the core 3 in portions where bottom surfaces of the cores 3 are in contact with the metal film A.

A method of manufacturing such an optical waveguide will be described.

Figure 2:
FIGS. 2(a) to 2(e) are sectional views schematically showing a method of manufacturing the optical waveguide of the first preferred embodiment.
Figure 2:
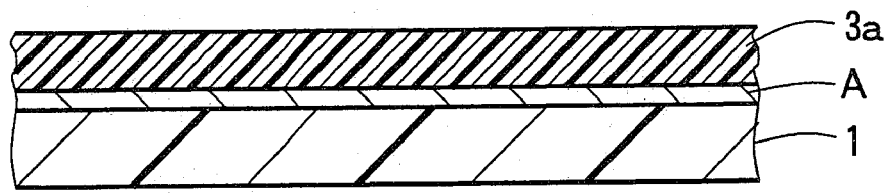
Figure 2:
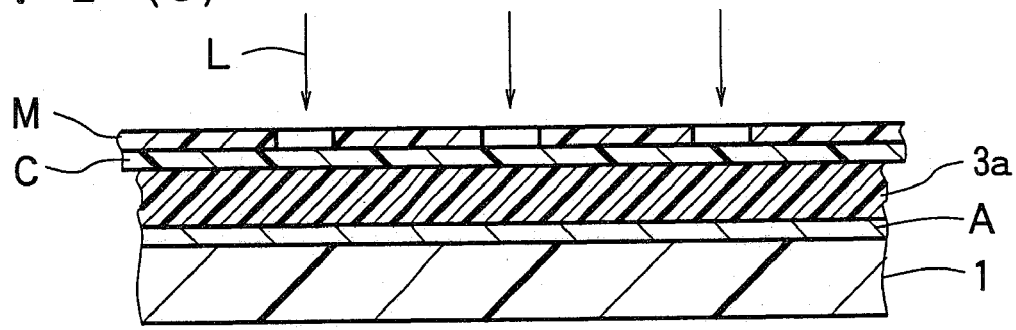
Figure 2:
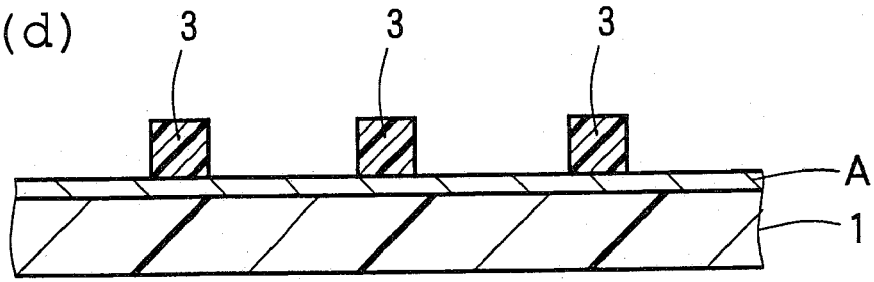
Figure 2:
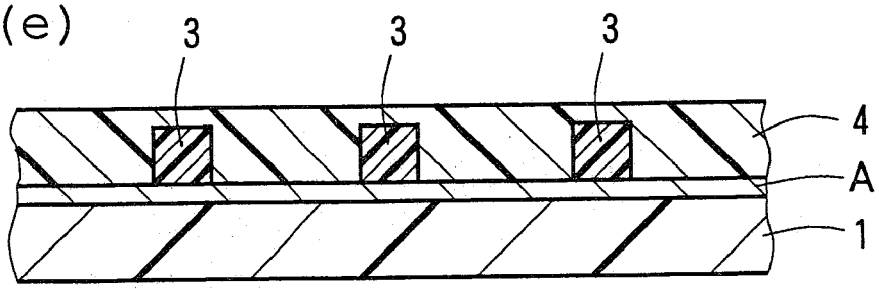

First, the substrate 1 is prepared, as shown in FIG. 2(a). The substrate 1 employed in this embodiment is not particularly limited. Examples of the substrate 1 include a resin substrate, a glass substrate, and a silicon substrate. Examples of a material for the formation of the resin substrate include polyethylene naphthalate, polyester, polyacrylate, polycarbonate, polynorbornene, and polyimide. The thickness of the substrate 1 is not particularly limited. The thickness may be generally set within a range of 20 μm (for a substrate of a film-like configuration) to 5 mm (for a substrate of a plate-like configuration).

Next, the metal film A is formed on the surface of the substrate 1, for example, by using any one of a sputtering method, a plasma method, a chemical vapor deposition method, and a plating method. Examples of a material for the formation of the metal film A include silver, aluminum, nickel, chromium, copper, and an alloy material including at least two of these elements. The thickness of the metal film A is not particularly limited, but is generally set within the range of 0.1 to 0.5 μm.

Next, as shown in FIG. 2(b), a resin layer 3a, which will later be formed into the cores 3 [see FIG. 2(d)] by selective exposure to radiation, is formed on the surface of the metal film A. In general, an example of a material for the formation of the resin layer 3a is a photopolymerizable resin which has a refractive index greater than that of a material for the formation of the over cladding layer 4 [see FIG. 2(e)] to be described later. The refractive index may be adjusted, for example, by properly selecting the types of materials or adjusting the composition ratio thereof for the formation of the cores 3 and the over cladding layer 4. The method of forming the resin layer 3a is not particularly limited. The resin layer 3a is formed by, for example, applying a varnish prepared by dissolving a photopolymerizable resin in a solvent onto the metal film A, and then drying the varnish. The varnish is applied by, for example, a spin coating method, a dipping method, a casting method, an injection method, or an ink jet method. The varnish is dried by a heat treatment, for example, at 50° C. to 120° C. for 10 to 30 minutes. To improve the adhesion between the metal film A and the cores 3 [see FIG. 2(d)] a primer resin treatment, a coupling agent treatment and the like may be performed on the surface of the metal film A prior to the formation of the resin layer 3a.

Then, as shown in FIG. 2(c), the surface of the dried resin layer 3a is covered with a translucent cover film C, and a photomask M formed with an opening pattern corresponding to a desired pattern of the cores 3 [see FIG. 2(d)] is placed on the cover film C. Thereafter, the resin layer 3a is exposed to radiation through the photomask M and cover film C. Exposed portions will later serve as the cores 3. Examples of the radiation for exposure used herein include visible light, ultraviolet radiation, infrared radiation, X-rays, alpha rays, beta rays, and gamma rays. Preferably, ultraviolet radiation is used. This is because the use of ultraviolet radiation achieves exposure with large energy to provide a high rate of cure, and an irradiation apparatus therefor is small in size and inexpensive to achieve the reduction in production costs. A light source of ultraviolet radiation may be, for example, a low-pressure mercury-vapor lamp, a high-pressure mercury-vapor lamp, or an ultra-high-pressure mercury-vapor lamp. The dose of ultraviolet radiation is generally 10 mJ/cm$^2$ to 10000 mJ/cm$^2$, preferably 50 mJ/cm$^2$ to 3000 mJ/cm$^2$.

After the exposure, a heating treatment is performed to complete a photoreaction at 80° C. to 250° C., preferably at 100° C. to 200° C., for 10 seconds to two hours, preferably for five minutes to one hour. Thereafter, development is performed using a developing solution to dissolve and remove an unexposed portion of the resin layer 3a, thereby patterning the resin layer 3a [see FIG. 2(d)]. A heating treatment is performed at 80° C. to 120° C. for 10 to 30 minutes, in general, to remove the developing solution in the patterned resin layer 3a, thereby forming the pattern of the cores 3, as shown in FIG. 2(d). In general, the thickness of each of the cores 3 is set at 20 μm to 100 μm for a multimode optical waveguide, and is set at 2 μm to 10 μm for a single-mode optical waveguide. Examples of methods of development include an immersion method, a spray method, and a puddle method. Examples of the developing solutions used herein include an organic solvent, and an organic solvent containing an alkaline aqueous solution. Such a developing solution and development conditions are selected as appropriate depending on the composition of a photopolymerizable resin composition.

Next, as shown in FIG. 2(e), the over cladding layer 4 is formed so as to cover the above-mentioned cores 3. Examples of the material for the formation of the over cladding layer 4 include polyimide resin, epoxy resin, and photopolymerizable resin. A method of forming the over cladding layer 4 is not particularly limited, but is performed, for example, by applying a varnish prepared by dissolving any one of the above-mentioned resins in a solvent so as to cover the above-mentioned cores 3, and then curing the varnish. The varnish is applied, for example, by a spin coating method, a dipping method, a casting method, an injection method, or an inkjet method. The varnish is cured as appropriate depending on the formation material and thickness of the over cladding layer 4 and the like. For example, where a polyimide resin is used as the material for the formation of the over cladding layer 4, the curing is carried out by a heating treatment at 300° C. to 400° C. for 60 to 180 minutes. Where a photopolymerizable resin is used as the material for the formation of the over cladding layer 4, the curing is carried out by an exposure to ultraviolet radiation at 1000 mJ/cm$^2$ to 5000 mJ/cm$^2$ followed by a heating treatment at 80° C. to 120° C. for 10 to 30 minutes. In general, the thickness of the over cladding layer 4 is set at 5 μm to 100 μm for a multimode optical waveguide, and is set at 1 μm to 20 μm for a single-mode optical waveguide.

In this manner, the optical waveguide (see FIG. 1) in which the metal film A, the cores 3 and the over cladding layer 4 are laminated on the surface of the substrate 1 is formed.

Although the over cladding layer 4 is formed in the first preferred embodiment, the over cladding layer 4 is not essential and may be omitted in the formation of the optical waveguide in some instances.

Figure 3:
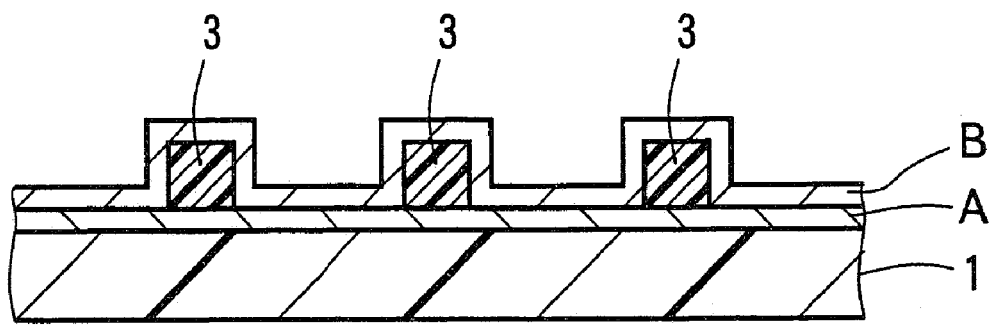
FIG. 3 is a sectional view schematically showing a second preferred embodiment of the optical waveguide according to the present invention.

FIG. 3 shows a second preferred embodiment of the optical waveguide according to the present invention. The optical waveguide according to the second preferred embodiment includes a second metal film B formed in place of the over cladding layer 4 (see FIG. 1) in the optical waveguide of the first preferred embodiment described above. Other parts of the second preferred embodiment are similar to those of the first preferred embodiment described above, and like reference numerals and characters are used to designate similar parts. In the optical waveguide of the second preferred embodiment, a surface of a first metal film A and a surface of the second metal film B serve as surfaces which reflect light passing through cores 3 in portions where bottom surfaces of the cores 3 and side and top surfaces of the cores 3 are in contact with the first and second metal films A and B, respectively.

A method of manufacturing the optical waveguide according to the second preferred embodiment includes a first step of forming the first metal film A and the cores 3 in this order [see FIG. 2(d)] on a substrate 1 in substantially the same manner as that of the first preferred embodiment described above [see FIGS. 2(a) to 2(d)]. Thereafter, as shown in FIG. 3, the second metal film B is formed on the side and top surfaces of the cores 3 in substantially the same manner as that of the method of forming the first metal film A, for example, by a sputtering method, a plasma method, a chemical vapor deposition method, or a plating method. Examples of a material for the formation of the second metal film B are substantially the same as those for the formation of the first metal film A, such as, silver, aluminum, nickel, chromium, or copper. The material for the formation of the second metal film B may be the same as or different from the material for the formation of the first metal film A. Thus, the optical waveguide according to the second preferred embodiment is obtained.

Figure 4:
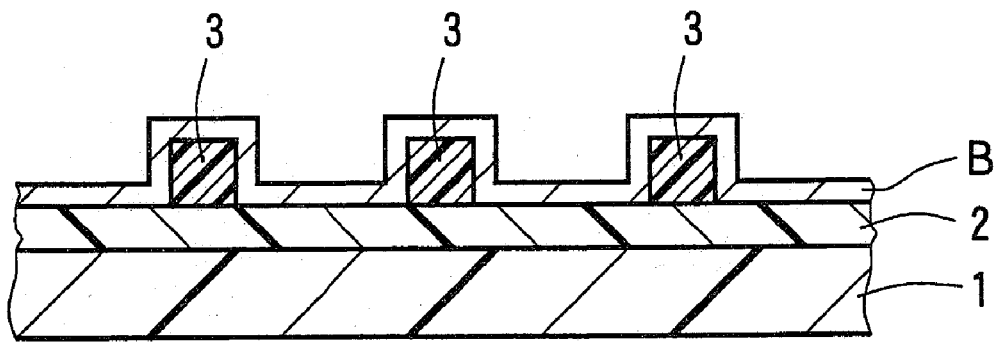
FIG. 4 is a sectional view schematically showing a third preferred embodiment of the optical waveguide according to the present invention.

FIG. 4 shows a third preferred embodiment of the optical waveguide according to the present invention. The optical waveguide according to the third preferred embodiment includes an under cladding layer 2 formed in place of the first metal film A (see FIG. 3) in the optical waveguide of the second preferred embodiment described above. Other parts of the third preferred embodiment are similar to those of the second preferred embodiment described above, and like reference numerals and characters are used to designate similar parts. In the optical waveguide of the third preferred embodiment, a surface of a metal film B serves as a surface which reflects light passing through cores 3 in portions where side and top surfaces of the cores 3 are in contact with the metal film B.

Figure 5:
FIGS. 5(a) to 5(c) are sectional views schematically showing a method of manufacturing the optical waveguide of the third preferred embodiment.
Figure 5:
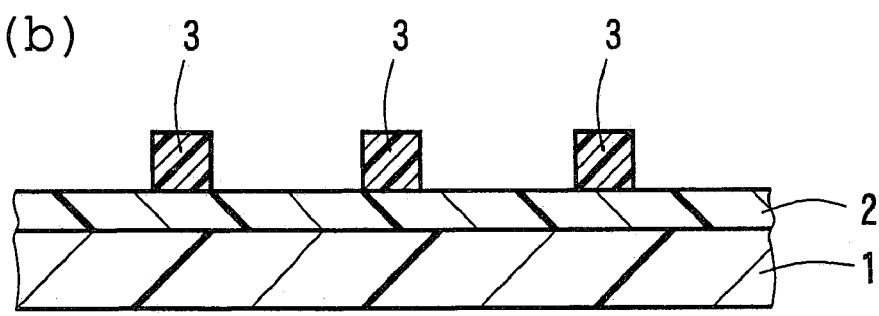
Figure 5:
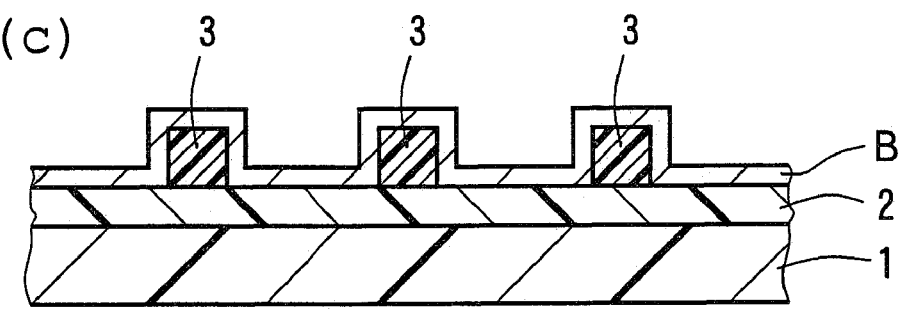
Figure 6:
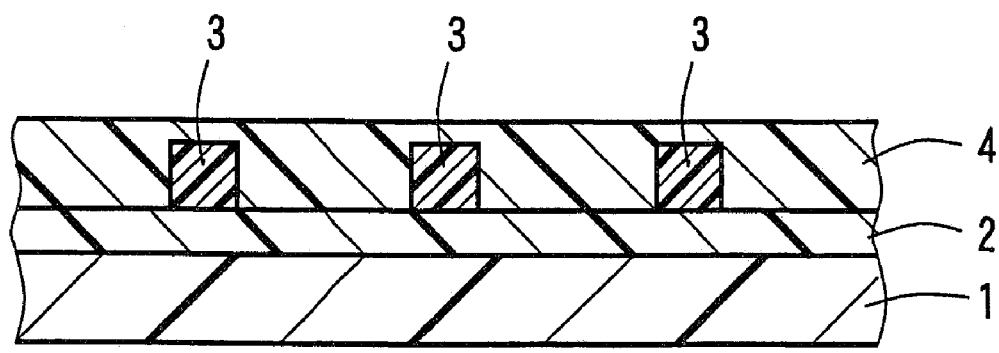
FIG. 6 is a sectional view schematically showing a related art optical waveguide.

A method of manufacturing the optical waveguide according to the third preferred embodiment includes a first step of forming the under cladding layer 2 on the surface of a substrate 1, as shown in FIG. 5(a). Examples of a material for the formation of the under cladding layer 2 are substantially the same as those for the formation of the over cladding layer 4 described in the first preferred embodiment [see FIG. 2(e)], such as, polyimide resin, epoxy resin, or photopolymerizable resin. The material for the formation of the under cladding layer 2 may be the same as or different from the material for the formation of the over cladding layer 4. A method of forming the under cladding layer 2 is performed in substantially the same manner as that for the above-mentioned over cladding layer 4. Specifically, a varnish, which will serve as the under cladding layer 2 later, is applied onto the surface of the substrate 1 by the spin coating method or the like. Thereafter, a heating treatment is performed where a polyimide resin is used as the material for the formation of the under cladding layer 2, and a heating treatment is performed after the irradiation with ultraviolet light where a photopolymerizable resin is used as the material for the formation of the under cladding layer 2. Thus, the under cladding layer 2 is formed. In general, the thickness of the under cladding layer 2 is set at 5 μm to 50 μm for a multimode optical waveguide, and is set at 1 μm to 20 μm for a single-mode optical waveguide. Next, as shown in FIG. 5(b), the cores 3 are formed on a surface of the under cladding layer 2 in substantially the same manner as that of the first and second preferred embodiments [see FIGS. 2(b) to 2(d)]. Thereafter, as shown in FIG. 5(c), a second metal film B is formed in substantially the same manner as that of the second preferred embodiment, for example, by a sputtering method, a plasma method, a chemical vapor deposition method, or a plating method. In this manner, the optical waveguide according to the third preferred embodiment is obtained.

Next, inventive examples will be described. It should be noted that the present invention is not limited to the inventive examples.

Example 1

Material for Formation of Over Cladding Layer

A material for formation of an over cladding layer was prepared by mixing 35 parts by weight of bisphenoxyethanolfluorene diglycidyl ether (component A), 40 parts by weight of (3',4'-Epoxycyclohexane)methyl 3',4'-Epoxycyclohexyl-carboxylate (component B), 25 parts by weight of an alicyclic epoxy resin (CELLOXIDE 2021P manufactured by Daicel Chemical Industries, Ltd.) (component C), and one part by weight of a 50% propione carbonate solution of 4,4-bis[di(β-hydroxyethoxy) phenylsulfinio]phenylsulfide bishexafluoroantimonate (photo-acid generator: component D).

Material for Formation of Cores

A material for the formation of the cores was prepared by dissolving 70 parts by weight of the above-mentioned component A, 30 parts by weight of 1,3,3-tris{4-[2-(3-oxetanyl)]butoxyphenyl}butane and 0.5 part by weight of the above-mentioned component D in 28 parts by weight of ethyl lactate.

Production of Optical Waveguide

First, a silver (Ag) film (having a thickness of 0.15 μm) was formed on a surface of a polyethylene naphthalate film [substrate: 100 mm×100 mm×188 μm (thick)] by sputtering.

Then, the material for the formation of the cores was applied to the surface of the silver (Ag) film by a spin coating method. Thereafter, a heating treatment was performed at 100° C. for 5 minutes. Next, a translucent cover film made of polycarbonate (having a thickness of 40 μm) was placed on the surface of the material for the formation of the cores, and a synthetic silica photomask formed with an opening pattern (core pattern) was placed on the surface of the cover film. Then, irradiation with ultraviolet radiation from above was performed at 4000 mJ/cm$^2$. After the photomask and the cover film were removed, a heating treatment was performed at 80° C. for 15 minutes. Next, development was carried out using an aqueous solution of γ-butyrolactone to dissolve and remove an unexposed portion. Thereafter, a heating treatment was performed at 100° C. for 15 minutes to form the cores (having a thickness of 50 μm).

Next, the material for the formation of the over cladding layer was applied by a spin coating method so as to cover the cores, and was then exposed to ultraviolet radiation at 2000 mJ/cm$^2$. Subsequently, a heating treatment was performed at 120° C. for 15 minutes to form the over cladding layer (having a thickness of 70 μm as measured from the surface of the under cladding layer).

In this manner, an optical waveguide (see FIG. 1) including a silver (Ag) film, cores and an over cladding layer stacked in the order named on a substrate was produced.

Example 2

An optical waveguide was produced in the same way as Example 1, except that an aluminum (Al) film (having a thickness of 0.15 μm) was formed by sputtering as the metal film in place of the silver (Ag) film in Example 1. Thus, an optical waveguide (see FIG. 1) including an aluminum (Al) film, cores and an over cladding layer stacked in the order named on a substrate was produced.

Example 3

An optical waveguide was produced in the same way as Example 1, except that a second silver (Ag) film (having a thickness of 0.15 μm) was formed on side and top surfaces of cores by sputtering in place of the over cladding layer in Example 1. Thus, an optical waveguide (see FIG. 3) including a silver (Ag) film, cores and a second silver (Ag) film stacked in the order named on a substrate was produced.

Example 4

An optical waveguide was produced in the same way as Example 1, except that an aluminum (Al) film (having a thickness of 0.15 μm) was formed on side and top surfaces of cores by sputtering in place of the over cladding layer in Example 1. Thus, an optical waveguide (see FIG. 3) including a silver (Ag) film, cores and an aluminum (Al) film stacked in the order named on a substrate was produced.

Example 5

Production of Optical Waveguide

First, a material substantially the same as that for the formation of the over cladding layer of Example 1 was applied to the surface of a polyethylene naphthalate film substantially the same as that of Example 1 by a spin coating method, and was then exposed to ultraviolet radiation at 2000 mJ/cm$^2$.

Subsequently, a heating treatment was performed at 100° C. for 15 minutes to form an under cladding layer (having a thickness of 20 μm).

Then, the material for the formation of the cores of Example 1 was applied to the surface of the under cladding layer by a spin coating method, and was then dried at 100° C. for 15 minutes. Next, a translucent cover film made of polycarbonate (having a thickness of 40 μm) was placed on the surface of the dried material for the formation of cores, and a synthetic silica photomask formed with an opening pattern (core pattern) was placed on the surface of the cover film. Then, exposure to ultraviolet radiation from above was performed at 4000 mJ/cm$^2$. After the photomask and the cover film were removed, a heating treatment was performed at 80° C. for 15 minutes. Next, development was carried out using an aqueous solution of γ-butyrolactone to dissolve and remove an unexposed portion. Thereafter, a heating treatment was performed at 100° C. for 15 minutes to form the cores (having a thickness of 50 μm).

Then, a silver (Ag) film (having a thickness of 0.15 μm) was formed on the side and top surfaces of the cores by sputtering.

Thus, an optical waveguide (see FIG. 4) including an under cladding layer, cores and a silver (Ag) film stacked in the order named on a substrate was produced.

Although specific forms of embodiments of the instant invention have been described above and illustrated in the accompanying drawings in order to be more clearly understood, the above description is made by way of examples and not as a limitation to the scope of the instant invention. It is contemplated that various modifications apparent to one of ordinary skill in the art could be made without departing from the scope of the invention which is to be determined by the following claims.

What is claimed is:

1. An optical waveguide comprising:
a substrate;
a core entirely formed of a single material of photopolymerized resin on said substrate and serving as a passageway for light;
a metal film formed on a surface of said substrate; and
a resin over cladding layer covering side and top surfaces of said core,
said core being formed such that a bottom surface thereof is entirely in contact with said metal film and such that said side and top surfaces thereof are in contact with said over cladding layer, said metal film having a thickness within a range of 0.1 to 0.5 μm.

2. An optical waveguide comprising:
a substrate;
a core entirely formed of a single material of photopolymerized resin on said substrate in a shape having a quadrangular cross section and a uniform height through entire length thereof, the core serving as a passageway for light; and
a metal film formed on a surface of said substrate,
said core being formed such that a bottom surface thereof is entirely in contact with said metal film and such that side and top surfaces thereof are exposed, said metal film having a thickness within a range of 0.1 to 0.5 μm.

3. An optical waveguide comprising:
a substrate;
a core entirely formed of a single material of photopolymerized resin on said substrate and serving as a passageway for light;
a first metal film formed on a surface of said substrate; and
a second metal film consisting of one layer and covering side and top surfaces of said core,
said core being formed such that a bottom surface thereof is entirely in contact with said first metal film and such that said side and top surfaces thereof are in contact with said second metal film, said first and second metal films each having a thickness within a range of 0.1 to 0.5 μm.

4. An optical waveguide comprising:
a substrate;
a core formed on said substrate and serving as a passageway for light;
a resin under cladding layer formed on a surface of said substrate; and
a metal film covering side and top surfaces of said core,
said core being formed on a surface of said under cladding layer such that a bottom surface of said core is entirely in contact with said under cladding layer and such that said side and top surfaces thereof are in contact with said metal film, said metal film having a thickness within a range of 0.1 to 0.5 μm.

* * * * *